United States Patent [19]

Hattori et al.

[11] Patent Number: 4,685,053
[45] Date of Patent: Aug. 4, 1987

[54] PROGRAMMABLE CONTROLLER WITH FAULT DETECTION

[75] Inventors: Kiyoshi Hattori, Shiroyama; Eiji Usuda, Fussa, both of Japan

[73] Assignee: Fanuc Ltd, Minamitsuru, Japan

[21] Appl. No.: 767,271

[22] PCT Filed: Dec. 5, 1984

[86] PCT No.: PCT/JP84/00576
§ 371 Date: Jul. 30, 1985
§ 102(e) Date: Jul. 30, 1985

[87] PCT Pub. No.: WO85/02694
PCT Pub. Date: Jun. 20, 1985

[30] Foreign Application Priority Data

Dec. 6, 1983 [JP] Japan .................. 58-229153

[51] Int. Cl.⁴ .................. G06F 9/00; G06F 11/00
[52] U.S. Cl. .................. 364/184; 364/140; 364/185; 364/900; 371/21; 371/29; 371/71

[58] Field of Search .................. 364/140–147, 364/184–187; 371/21, 29, 16, 20, 24, 25, 67, 68, 71; 364/900 MS File

[56] References Cited

U.S. PATENT DOCUMENTS

| | | | |
|---|---|---|---|
| 4,095,094 | 6/1978 | Struger et al. | 364/900 X |
| 4,118,792 | 10/1978 | Struger et al. | 364/184 X |
| 4,251,883 | 2/1981 | Grants et al. | 371/29 |
| 4,527,271 | 7/1985 | Hallee et al. | 364/184 X |
| 4,535,456 | 8/1985 | Bauer et al. | 364/141 X |
| 4,560,936 | 12/1985 | Pelowski | 364/140 X |
| 4,592,053 | 5/1986 | Matsuura | 371/29 |

*Primary Examiner*—Joseph Ruggiero
*Attorney, Agent, or Firm*—Staas & Halsey

[57] ABSTRACT

An input signal (A) and an output signal (B) with respect to an output memory (8), and an output signal (C) of an output circuit (9) in a programmable controller are compared with each other. The identification of and an abnormal part is displayed in accordance with the comparison results.

2 Claims, 3 Drawing Figures

PROGRAMMABLE CONTROLLER WITH FAULT DETECTION

BACKGROUND OF THE INVENTION

The present invention relates to a programmable controller for detecting an abnormal state of an output signal.

A conventional programmable controller performs sequence control such that a sequence program is stored in a memory therein and a relay or the like of an external device is operated in accordance with the sequence program. When a load resistance of the external device, is small, an element, such as a transistor of an output circuit of a programmable controller, may be damaged. When sequence control is continued even though the element of the output circuit is damaged, normal sequence control cannot be performed. A conventional programmable controller does not have a means for checking such a failure.

SUMMARY OF THE INVENTION

It is an object of the present invention to provide a programmable controller to eliminate the conventional drawback described above, by detecting an abnormal state of an output signal therefrom and determining an abnormal part in a circuit.

In order to achieve the above object of the present invention, there is provided a programmable controller, wherein a feedback circuit is provided for feeding an output from an output circuit back to an operation device, the output circuit transmitting an output signal from an output memory to an external circuit; input and output signals with respect to the output memory and the output signal from the output circuit are compared with each other; an abnormality of the output circuit is displayed on a display device when the output signal from the output circuit does not coincide with the input signal to the output memory and the input signal to the output memory coincides with the output signal therefrom, and an abnormality of the output memory is displayed on the display device when the output signal from the output circuit does not coincide with the input signal to the output memory and the input signal to the output memory does not coincide with the output signal therefrom.

With the arrangement described above, since the input and output signals with respect to the output memory and the output signal from the output circuit are compared to detect coincidences and an abnormal part in the circuit is displayed on the display device upon detection of a noncoincidence, the abnormality and failure of the output circuit and the output memory which tend to be influenced by an external circuit connected thereto are immediately found, thereby preventing erroneous operation of the programmable controller.

DETAILED DESCRIPTION OF THE PREFERRED EMBODIMENT

The present invention will be described with reference to the accompanying drawings.

Figure 1:
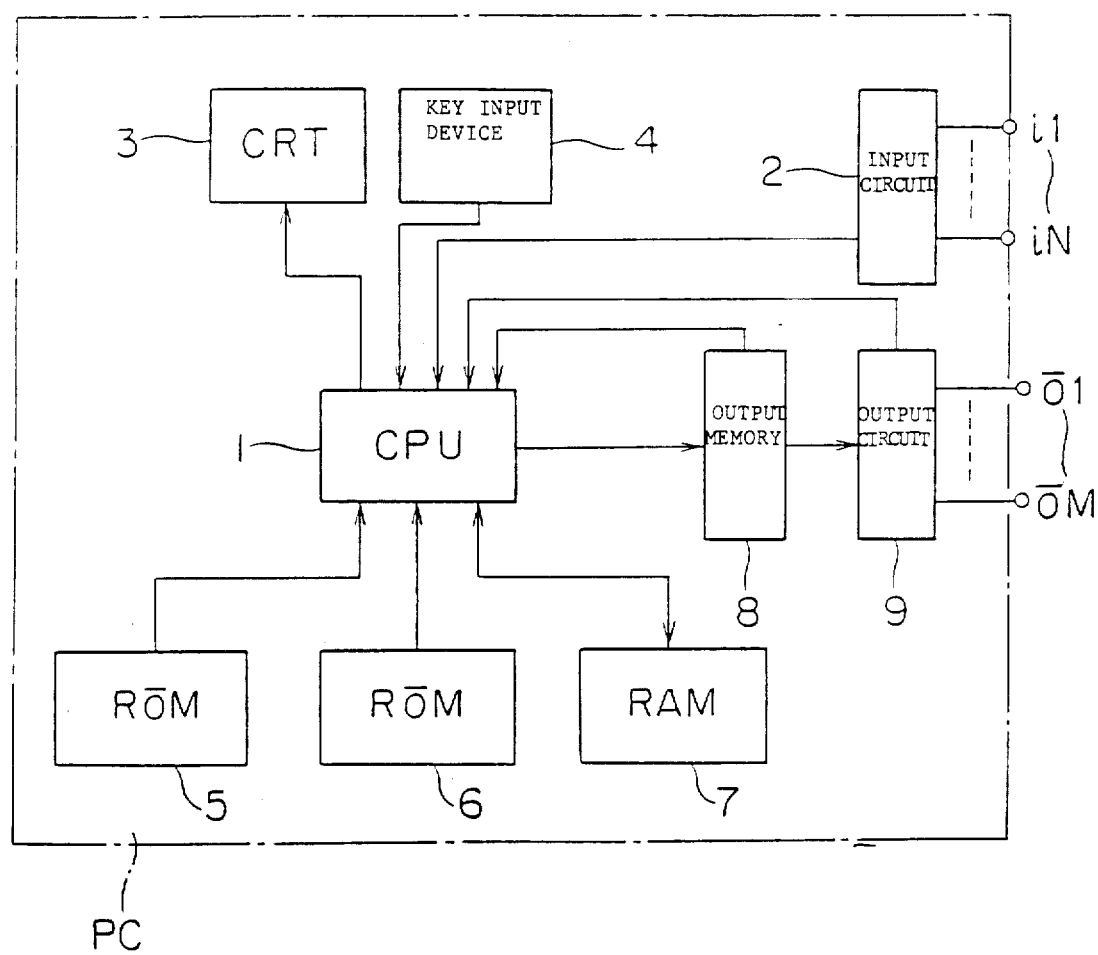
FIG. 1 is a block diagram of an embodiment the present invention.

FIG. 1 is a block diagram of a programmable controller according to an embodiment of the present invention. Reference numeral 1 denotes a computing unit (to be referred to as a CPU hereinafter) having an arithmetic and logic function for determining the state of an output signal upon reception of an input signal, and a display instruction function for causing a CRT 3 to display data in accordance with a program stored in a ROM 5 for sequence control (to be described later). Reference numeral 2 denotes an input circuit for receiving signals from an external limit switch, a proximity switch and switches on an operation panel. Reference numeral 3 denotes a display device for displaying a state of the programmable controller and states of the input and output signals. Reference numeral 4 denotes a key input device for designating a display mode for the CPU 1 and an operation mode of the programmable controller. Reference numeral 5 denotes a ROM for storing a sequence program for determining the operation of a machine as an object of interest. Reference numeral 6 denotes a ROM for receiving the sequence program from the ROM 5 and causing the CPU 1 to perform arithmetic operations. The ROM 6 also stores a program for reading a keyboard input and causing the display device 3 to display data. Reference numeral 7 denotes a RAM for temporarily storing data during arithmetic operations; 8, an output memory for generating an arithmetic result of the CPU 1 to an external device; and 9, an output circuit for generating a signal representing a state of the output memory 8.

Figure 2:
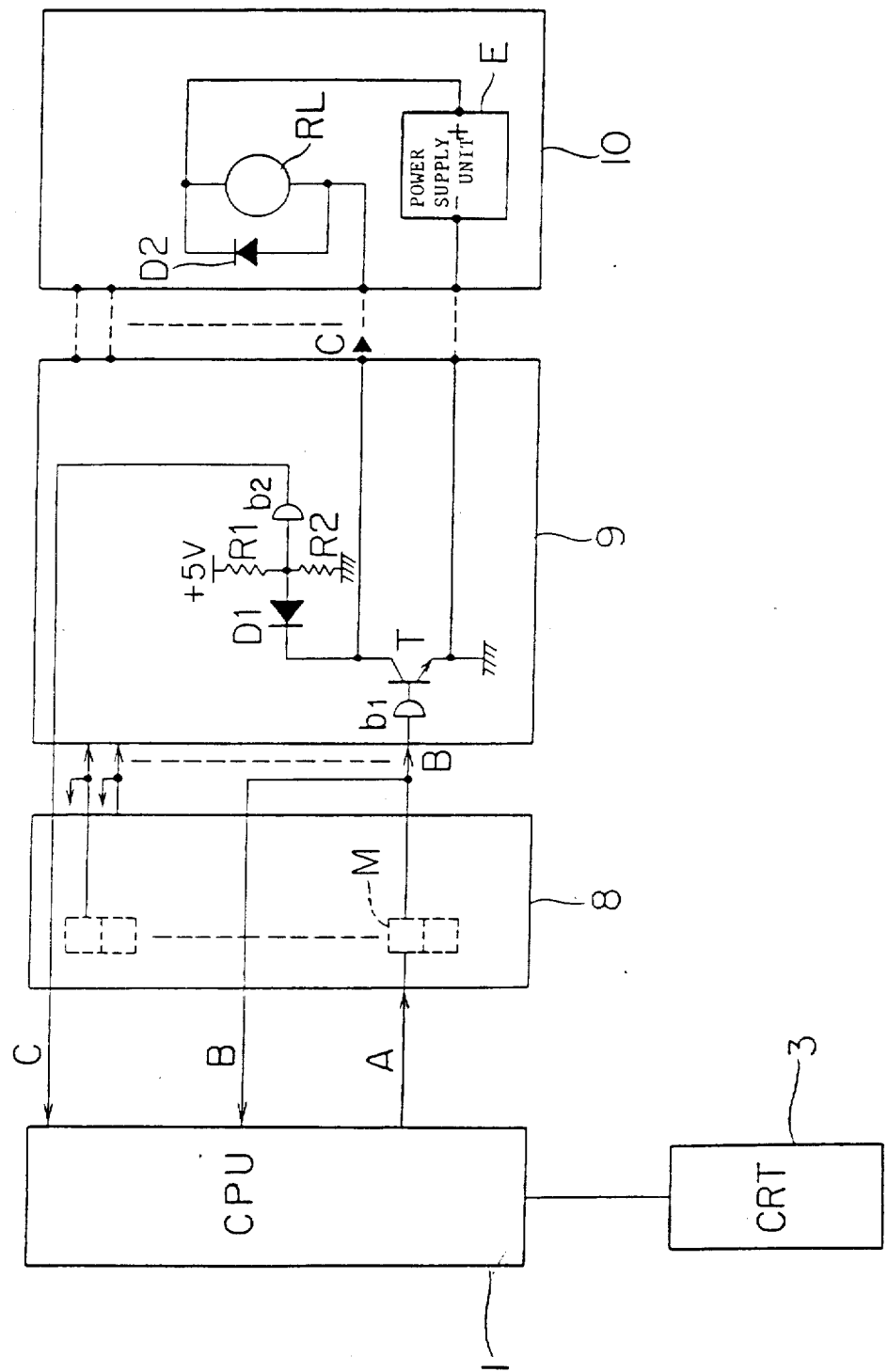
FIG. 2 is a circuit diagram of a feedback circuit of the embodiment.

The main feature of the present invention lies in the arrangement wherein output signals from the output memory 8 and the output circuit 9 are fed back to the CPU 1. An arrangement of the feedback circuit is shown in FIG. 2. Referring to FIG. 2, reference symbol M denotes a memory element in the output memory 8; b1 and b2, buffers, respectively; T, a transistor; D1, a diode; and R1 and R2, resistors, respectively. The buffers b1 and b2, the transistor T, the diode D1, the resistors R1 and R2 are provided for each memory element M in the output memory 8 to constitute the output circuit 9. Unlike in the conventional output circuit, the diode D1, the resistors R1 and R2 and the buffer b2 are added in the feedback circuit of this embodiment. The CPU receives a feedback signal C of the output signal from the feedback circuit. Reference numeral 10 denotes an external circuit in an external device. Reference symbol E is a power supply unit; RL, a relay; and D2, a diode. An output signal (i.e., an input signal A to the output memory) from the CPU 1 is stored in one memory element M in the output memory 8. An output signal B read from the memory element M in the output memory 8 is supplied to the output circuit 9 and is fed back to the CPU 1. The output signal B1 from the output memory 8 is supplied to the buffer b1 in the output circuit 9 to control on/off operation of the transistor T. An output signal C from the output circuit 9 is supplied to the external circuit 10 to energize the relay RL or the like. The output signal C is also fed back to the CPU 1 through the feedback circuit consisting of the diode D1, the resistors R1 and R2 and the buffer b2.

Figure 3:
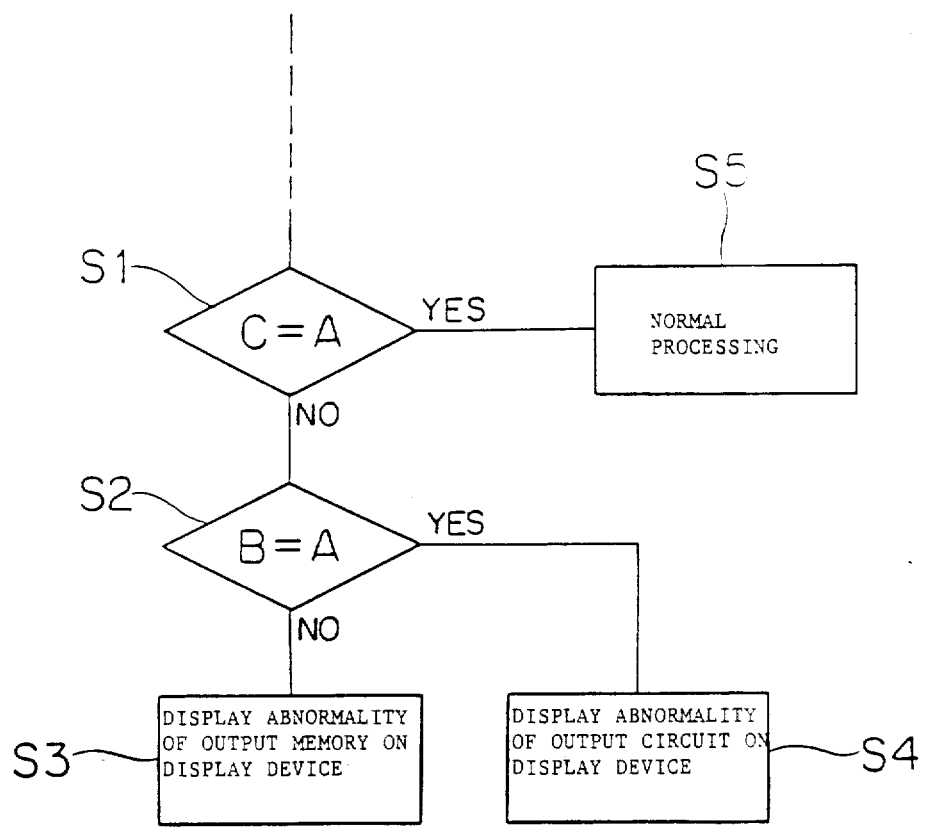
FIG. 3 is a flow chart for explaining processing in accordance with the embodiment.

Abnormal state detection processing of the present invention will be described with reference to an operation flow of FIG. 3.

When the input signal A is supplied from the CPU 1 to the output memory 8, a comparing means in the CPU 1 compares all bits of the input signal A to the output memory 8 with those of the output signal C fed back from the output circuit 9 (step S1). When the comparing means detects a coincidence between all the bits of the input signal A and the output signal C, the CPU detects that normal operation is performed, so that the flow advances to a normal processing (i.e., step S5). However, if there is not coincidence (i.e., NO in step S1), i.e., the comparing means compares all bits of the input signal A to the output memory 8 with those of the output signal B from the output memory 8 (step S2). If YES in step S2, the CPU 1 determines that the output memory 8 is normally operated and that the output circuit 9 is abnormal, thereby causing the display device 3 to display an abnormality of the output circuit 9 (step S4). However, when the comparing means detects that all the bits of the input signal A to the output memory 8, do not coincide with those of the output signal B from the output memory 8, the CPU 1 determines that the output memory 8 is abnormal, thereby causing the display device 3 to display an abnormality of the output memory 8 (step S3).

What is claimed is:

1. A programmable controller connectable to an external unit, comprising:

a central processing unit for providing a first signal;

an output memory, coupled to said central processing unit, for storing the first signal from said central processing unit and for providing, as an output, a second signal, the second signal also being fed back to said central processing unit;

an output circuit, coupled to said central processing unit and said output memory, and connectable to the external unit, for receiving the second signal from said output memory and for providing, as an output to the external unit, a third signal, said output circuit including means for feeding back the third signal to said central processing unit, said output circuit and said output memory being susceptible to damage and abnormal operation when said output circuit is connected to the external unit, said central processing unit including:

means for comparing the first and third signals, for comparing the first and second signals and for generating a first abnormality signal indicative of an abnormality in said output circuit if the first and third signals do not coincide and for generating a second abnormality signal indicative of an abnormality in said output memory if the first and second signals do not coincide; and a display device, coupled to said central processing unit, for providing a display identifying an abnormality in one of said output circuit and said output memory when the corresponding one of the first and second abnormality signals is generated.

2. A programmable controller according to claim 1, wherein said feedback means of said output circuit comprises:

a first buffer, connected to said output memory, for receiving the second signal;

a transistor connected to said first buffer;

a diode connected to said transistor; and a second buffer connected to said diode and to said central processing unit.

* * * * *

UNITED STATES PATENT AND TRADEMARK OFFICE
CERTIFICATE OF CORRECTION

PATENT NO. : 4,685,053

DATED : AUGUST 4, 1987

INVENTOR(S) : KIYOSHI HATTORI ET AL.

It is certified that error appears in the above-identified patent and that said Letters Patent is hereby corrected as shown below:

Col. 1, line 8, change "device," to --device--.

Col. 2, line 61, change "B1" to --B--.

Col. 3, line 13, delete "i.e.,";
    line 18, before "YES" insert --there is coincidence (i.e.,--;
    line 18, change "S2," to --S2),--.

Signed and Sealed this

Nineteenth Day of January, 1988

Attest:

DONALD J. QUIGG

Attesting Officer

Commissioner of Patents and Trademarks